(12) United States Patent
Schmitt et al.

(10) Patent No.: US 8,089,048 B2
(45) Date of Patent: Jan. 3, 2012

(54) DISCRIMINATION-ENHANCED FIBER-OPTIC SCINTILLATOR RADIATION DETECTOR

(75) Inventors: William M. Schmitt, Arlington, MA (US); Juha-Pekka J. Laine, Boston, MA (US); Peter Miraglia, Weymouth, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 57 days.

(21) Appl. No.: 12/625,292

(22) Filed: Nov. 24, 2009

(65) Prior Publication Data

US 2010/0127177 A1 May 27, 2010

Related U.S. Application Data

(60) Provisional application No. 61/117,320, filed on Nov. 24, 2008.

(51) Int. Cl.
    *G01T 1/20* (2006.01)
(52) U.S. Cl. ........................................................ 250/362
(58) Field of Classification Search .................. 250/362, 250/367, 368, 390.01, 390.11, 474.1, 483.1, 250/485.1, 487.1
    See application file for complete search history.

(56) References Cited

U.S. PATENT DOCUMENTS

| | | | |
|---|---|---|---|
| 4,415,810 A | 11/1983 | Brown, Sr. | |
| 4,788,436 A * | 11/1988 | Koechner | 250/485.1 |
| 5,155,366 A | 10/1992 | Miller | |
| 5,168,540 A * | 12/1992 | Winn et al. | 385/128 |
| 5,308,986 A | 5/1994 | Walker | |
| 5,399,863 A | 3/1995 | Carron et al. | |
| 5,636,299 A | 6/1997 | Bueno et al. | |
| 5,680,423 A | 10/1997 | Perkins et al. | |
| 5,714,761 A | 2/1998 | Fay | |
| 5,880,469 A | 3/1999 | Miller | |
| 5,880,475 A * | 3/1999 | Oka et al. | 250/483.1 |
| 6,384,400 B1 * | 5/2002 | Albagli et al. | 250/214 VT |
| 6,707,047 B2 | 3/2004 | Craig et al. | |
| 6,989,541 B2 | 1/2006 | Penn | |
| 7,141,799 B1 | 11/2006 | Neal et al. | |
| 7,214,943 B2 * | 5/2007 | Katagiri et al. | 250/368 |
| 7,288,771 B2 | 10/2007 | Neal et al. | |
| 7,485,877 B2 | 2/2009 | Kearfott | |
| 7,521,686 B2 | 4/2009 | Stuenkel et al. | |
| 7,582,880 B2 | 9/2009 | Wallace et al. | |
| 2002/0102395 A1 * | 8/2002 | Duclos | 428/297.4 |
| 2003/0098418 A1 * | 5/2003 | Joubert | 250/368 |
| 2005/0023479 A1 * | 2/2005 | Grodzins | 250/390.11 |
| 2008/0237485 A1 * | 10/2008 | Beinhocker | 250/474.1 |
| 2009/0014662 A1 | 1/2009 | Suhami | |

(Continued)

OTHER PUBLICATIONS

Bliss et al. "Scintillating Glass Fiber Neutron Sensors: I. Production and Optical Characterization," U.S. Department of Energy, Contract No. DE-AC06-76RLO 1830, Pacific Northwest Laboratory, Workshop on Scintillating Fiber Detection, Oct. 24-28, 1993, 9 pages.

(Continued)

*Primary Examiner* — David Porta
*Assistant Examiner* — Marcus Taningco
(74) *Attorney, Agent, or Firm* — Goodwin Procter LLP

(57) ABSTRACT

A fiber-optic scintillator radiation detector includes a multitude of optical fibers that each include an optical core. The optical cores are spaced apart from one another by an interposer material. In various embodiments, the interposer material has an average atomic number less than 13 and a density greater than 1.3 g/cm$^3$.

23 Claims, 3 Drawing Sheets

U.S. PATENT DOCUMENTS

2009/0140150 A1 6/2009 Ivan et al.
2010/0111487 A1* 5/2010 Aitken et al. .............. 385/141

OTHER PUBLICATIONS

Bliss et al. "A Variety of Neutron Sensors Based on Scintillating Glass Waveguides," U.S. Department of Energy, Contract No. DE-AC06-76RLO 1830, Pacific Northwest Laboratory, 1995 Fiber Optic Sensor Workshop, May 3-4, 1995, Retrieved from the Internet: <http://www.osti.gov/bridge/servlets/purl/88580-u63KFZ/webviewable/88580.pdf>, 7 pages.

Craig et al. "Predicted Performance of Neutron Spectrometers Using Scintillating Fibers," U.S. Department of Energy, Contract No. DE-AC0676RLO 1830, Pacific Northwest National Laboratory, Feb. 2000, Retrieved from the Internet: <http://www.pnl.gov/main/publications/external/technical_reports/PNNL-13111.pdf>, 27 pages.

Miley et al. "High Sensitivity, Low Profile Neutron Detector for Safeguards Measurements," Nuclear Science Symposium and Medical Imaging Conference, 1993, IEEE Conference Record, Aug. 6, 2002, pp. 606-608.

Sailor et al. "Conceptual Design for a Scintillating-Fiber Neutron Detector for Fusion Reactor Plasma Diagnostics," Los Alamos National Laboratory, 10th Topical Conference on High-Temperature Plasma Diagnostics, Rochester, NY, May 8-12, 1994, Retrieved from the Internet: <http://sailor87506.net/pubs09/Rochester.pdf>, 8 pages.

Seymour et al. "Performance of a Neutron-Sensitive Scintillating Glass-Fiber Panel for Portal, Freight, and Vehicle Monitoring," Nuclear Waste Engineering Section, vol. 3536, Nov. 1998, pp. 148-155.

Singkarat et al. "Development of an Encapsulated Scintillating Fiber Detector as a 14-MeV Neutron Sensor," Nuclear Instruments and Methods in Physics Research A, vol. 384, 1997, pp. 463-470.

Spector et al. "Scintillator Fiber Optic Counter for Neuron Detection," Nuclear Instruments and Methods in Physics Research, vol. A309, 1991, pp. 303-307.

Wurden et al., Scintillating-Fiber 14-MeV Neutron Detector on TFTR During DT, Operation, Rev. Sci. Instrum., vol. 66, No. 1, Jan. 1995, 901-903.

Zhang et al. "A New Scintillating-Fiber-Array Neutron Detector," Nuclear Instruments and Methods in Physics Research A, vol. 486, 2002, pp. 708-715.

International Search Report for PCT Application No. PCT/US2009/065753, mailed May 5, 2011, 5 pages.

Written Opinion for PCT Application No. PCT/US2009/065753, mailed May 5, 2011, 10 pages.

Invitation to Pay Additional Fees and Partial International Search for PCT Application No. PCT/US2009/065753, mailed Feb. 25, 2011, 6 pages.

* cited by examiner

DISCRIMINATION-ENHANCED FIBER-OPTIC SCINTILLATOR RADIATION DETECTOR

CROSS-REFERENCE TO RELATED APPLICATION

This application claims priority to and the benefit of, and incorporates herein by reference in its entirety, U.S. Provisional Patent Application No. 61/117,320, which was filed on Nov. 24, 2008.

TECHNICAL FIELD

In various embodiments, the present invention relates to improved systems and methods for fiber-based scintillation radiation detection.

BACKGROUND

Scintillating materials are commonly used in radiation detectors. Such materials typically indicate the presence of a neutron flux by the emission of scintillation photons. Recent developments have allowed these scintillating materials to be drawn into optical fibers. The light-guide property of the fiber collects the scintillation light generated over the entire length of the fiber and delivers it to the fiber end facets, where it is gathered for analysis in photomultiplier tubes. A fiber-optic scintillation detector typically allows for the creation of a relatively inexpensive, robust, and versatile large-area radiation detector.

Many fiber-based scintillation neutron detectors contain layers of closely-packed fibers for planar coverage. However, in this configuration, a Compton electron (which may be generated from a gamma ray) may cross through multiple fibers in the fiber bundle. While the scintillation light generated by the Compton electron in a single fiber is small, the total scintillation light accumulated in the fiber bundle is often large enough to mimic a neutron event. Thus, this configuration suffers from a poor ability to reject gamma rays, which interfere with the neutron signal. In fact, the ability to reject gamma rays when the fibers are closely packed in a bundle compares unfavorably with competing technologies.

The gamma rejection ratio of these closely-packed fiber-based scintillation neutron detectors can be increased as high as approximately $10^4:1$, but at the cost of added system complexity and reduced neutron sensitivity. Alternatively, electronic logic circuitry may be employed in these detectors to distinguish neutron-induced scintillation light from that induced by other events, such as the presence of gamma rays. However, such an approach again increases the system's cost and adds to its complexity.

A variety of approaches have been employed in a variety of different contexts in an attempt to separate individual fibers in order to optimize the detection of neutrons. The materials employed to separate the fibers in these previous approaches have, however, proved ineffective at or inappropriate for increasing the gamma rejection ratio.

As such, needs exist for an improved fiber-based scintillation neutron detector.

SUMMARY OF THE INVENTION

In various embodiments of the present invention, rather than having the optical fibers of a fiber-based scintillation neutron detector closely packed in each layer, the optical cores of the fibers in each layer are instead spaced out with an interposer material that helps to reject gamma rays. In one embodiment, the interposer material is chosen to optimize the detection of low-energy neutrons (i.e., neutrons having an energy level on the order of or less than $2.5 \times 10^{-8}$ MeV), such as thermal neutrons, in the face of interfering gamma rays. The chosen interposer material may have a high density (i.e., greater than $1.3$ g/cm$^3$) and a low average atomic number (i.e., an average atomic number less than 13). It has been determined that lower density materials provide for no appreciable increase in the gamma rejection ratio and materials with a higher average atomic number tend to generate more Compton electron scintillation light due to larger photoelectron production.

In other embodiments, the thickness of the interposer material is chosen so as to separate each optical fiber core from its neighboring optical fiber cores by a distance equal to approximately twice the core diameter. This too helps to reject gamma rays. In fact, in various embodiments, this new geometry and the above-described features of the interposer material increase the gamma rejection ratio by a factor of approximately 10 to yield a rejection ratio of approximately $10^5:1$.

In general, in one aspect, embodiments of the invention feature a fiber-optic scintillator radiation detector that includes a plurality of optical fibers. Each optical fiber includes an optical core, and the optical cores are spaced apart from one another by an interposer material. The interposer material may have an average atomic number less than 13 and a density greater than $1.3$ g/cm$^3$. In addition, the optical cores may be regularly spaced such that a center of each optical core is at a distance of approximately twice the core diameter from a center of each of its neighboring optical cores. The spacing between the center of each optical core may, for example, lie in a range between approximately 10 microns and approximately 600 microns.

In various embodiments, the interposer material comprises or consists essentially of silicon dioxide, graphite, glass, an organic polymer, a plastic, an epoxy, or combinations thereof. Each optical fiber may further include a cladding surrounding its optical core. The interposer material may be encapsulated between the cladding and the optical core of each optical fiber. Alternatively, a matrix of the interposer material may surround the cladding of each optical fiber. In various embodiments, the interposer material and the spacing of the optical cores together provide a gamma rejection ratio for the detector of approximately $10^5:1$.

In general, in another aspect, embodiments of the invention feature methods for detecting radiation. More particularly, a neutron is detected with a plurality of optical fibers sensitive thereto. The fibers may be arranged in a fiber-optic scintillator radiation detector having the features described above.

In one embodiment, the detected neutron has an energy level on the order of or less than $2.5 \times 10^{-8}$ MeV. For example, the detected neutron may be a thermal neutron. Moreover, in accordance with the methods, Compton electrons may be absorbed in the interposer material.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1:
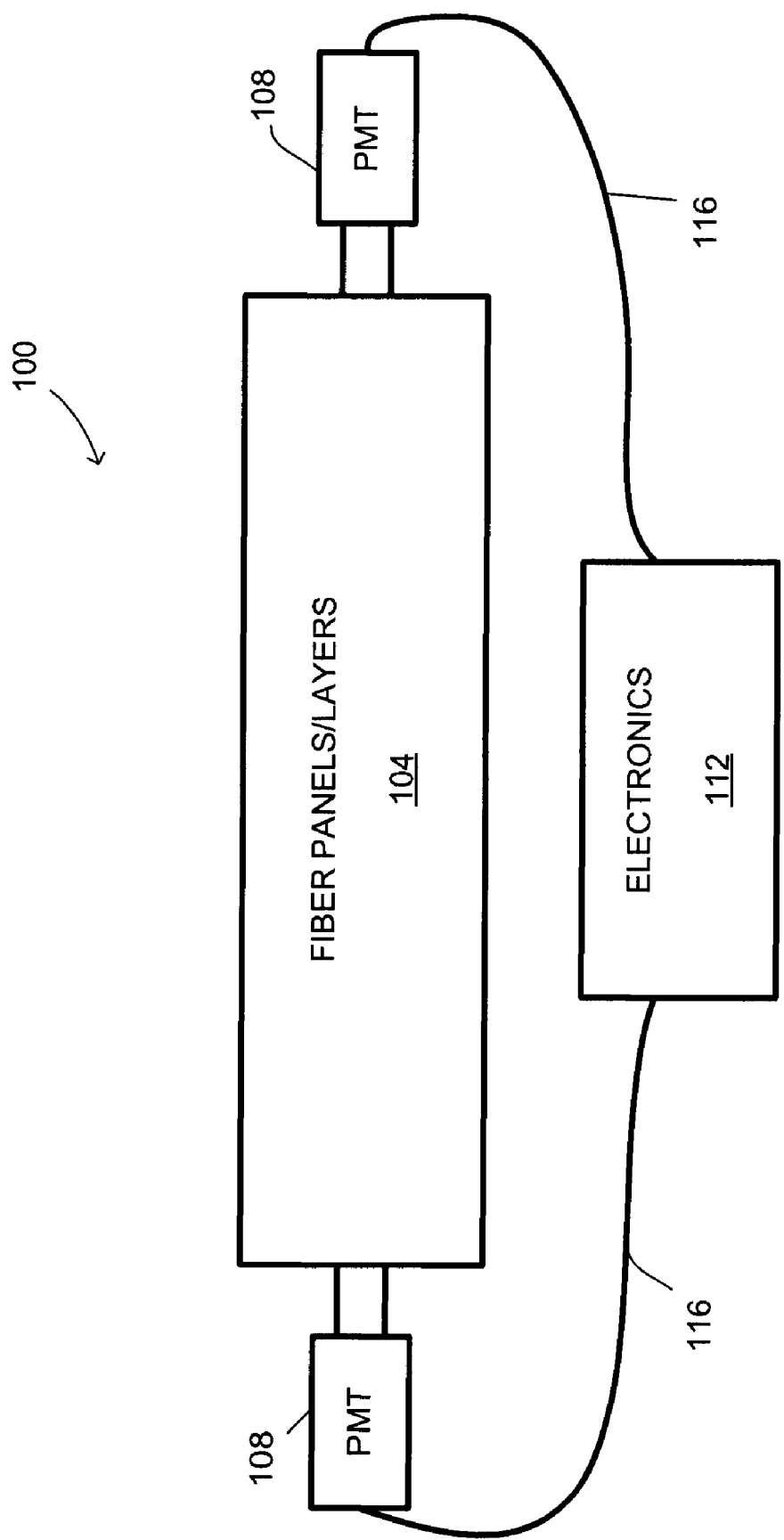
FIG. 1 schematically illustrates a fiber-optic scintillator radiation detector in accordance with one embodiment of the invention.

In various embodiments, the present invention features a fiber-optic scintillator radiation detector in which the optical cores of individual fibers are spaced apart from one another with an interposer material. FIG. 1 schematically depicts one such exemplary detector 100. As illustrated, the detector 100 includes a plurality of panels (or layers) 104 that house the optical fibers, photomultiplier tubes 108 that couple to the fiber end facets and that detect and collect the scintillation light generated in and delivered through the optical fibers, and electronics 112 coupled by cables 116 to the photomultiplier tubes 108 for analyzing the collected light.

Figure 2:
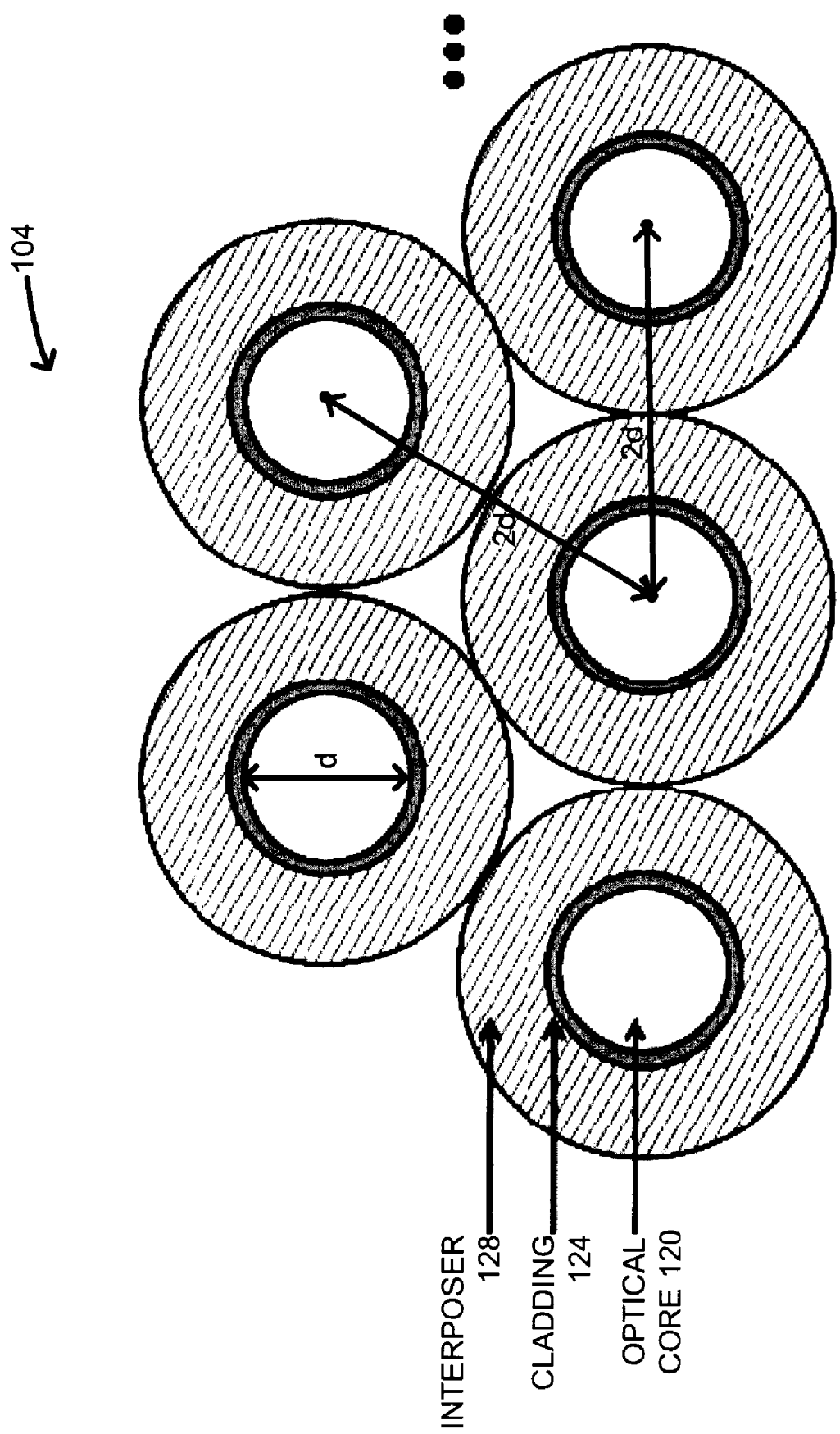
FIG. 2 schematically illustrates a cross-sectional view of a fiber layer in accordance with one embodiment of the invention.
Figure 3:
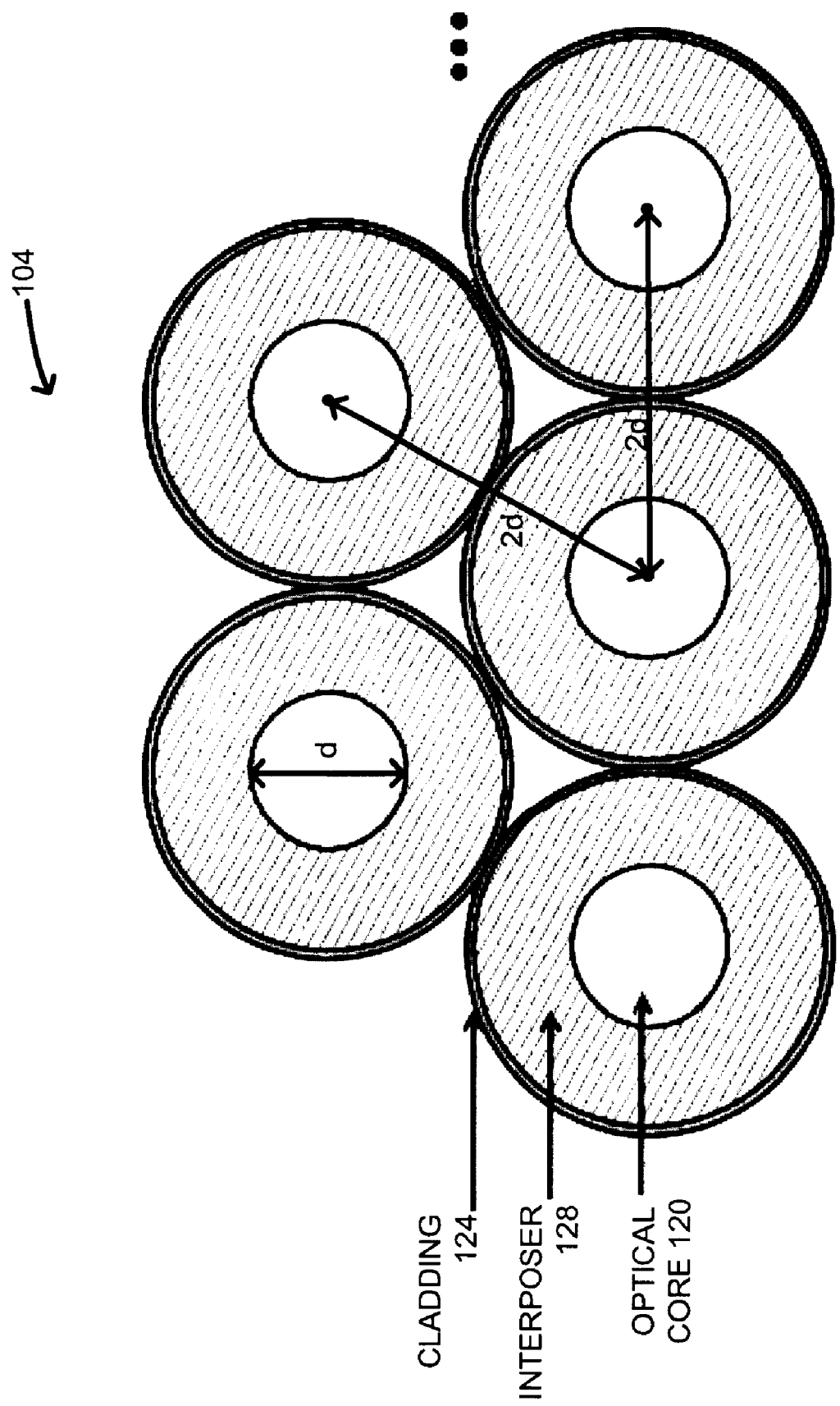
FIG. 3 schematically illustrates a cross-sectional view of a fiber layer in accordance with another embodiment of the invention.

FIGS. 2 and 3 schematically depict cross-sectional views of a single fiber layer 104 in accordance with two different embodiments of the invention. As depicted in FIG. 2, each optical fiber includes an optical core 120 that is directly encapsulated by a cladding 124, and the plurality of optical fibers are positioned within a matrix of an interposer material 128. In contrast, as depicted in FIG. 3, the interposer material 128 is encapsulated between the cladding 124 and the optical core 120 of each optical fiber. In both cases, however, the plurality of optical cores 120 are spaced apart from one another by the interposer material 128. Although the interposer material 128 is illustrated in FIG. 2 as being concentric with each of the optical cores 120, it need not be. For example, as further described below, the interposer material 128 may be a solid block having tubular passages therethrough within which the optical fibers are placed. Similarly, the interposer material 128 need not be concentric with each of the optical cores 120 depicted in the embodiment of FIG. 3.

Each optical fiber is sensitive to thermal neutrons (i.e., to neutrons having an energy level of less than $2.5 \times 10^{-8}$ MeV) in the sense that each optical fiber scintillates in the presence of a thermal neutron flux. For example, each optical fiber may be a cerium-activated, lithium-silicate scintillating fiber fabricated via the hot-downdraw process developed by the Pacific Northwest National Laboratory ("PNNL"). PNNL's hot-downdraw process for fabricating such an optical fiber is described, for example, in U.S. Pat. No. 5,680,423 and in K. H. Abel, et al., "Scintillating Glass Fiber Neutron Sensors: I. Production and Optical Characterization," SCIFI 93 Workshop on Scintillating Fiber Detectors, edited by A. D. Bross, R. C. Ruchti, and M. R. Wayne, World Scientific, New Jersey, pp. 387-394 (1995), the contents of which are hereby incorporated herein by reference in their entirety.

As will be understood by those of ordinary skill in the art, a thermal neutron incident on a cerium-activated, lithium-silicate scintillating optical fiber induces a $^6$Li(n,$\alpha$)$^3$H reaction. This reaction is exothermic, releasing approximately 4.7 MeV, the majority of which is carried away by the triton. The triton and alpha particles each interact with the glass matrix to produce an ionization trail. When this ionization transfers energy to a $Ce^{3+}$ ion, the emission of optical photons of approximately 400 nm in wavelength occurs during the return to ground state. Fluorescence lifetime is about 40 to 60 ns. A fraction of the emitted photons, depending upon the numerical aperture of the fiber, will then be confined inside the fiber and be transmitted therealong via total internal reflection to the fiber end facets that are in optical communication with the photomultiplier tubes 108 depicted in FIG. 1.

Of course, scintillating optical fibers other than the above-described cerium-activated, lithium-silicate fibers may instead be employed to scintillate in the presence of a thermal neutron flux. For example, other activators (e.g., $Tb^{3+}$ or other lanthanide ions) may be incorporated in a lithium fiber in place of the $Ce^{3+}$.

Without the interposer material 128 depicted in FIGS. 2 and 3 (i.e., in the case where the optical cores 120 are closely packed (e.g., bundled together), as opposed to being spaced apart), the fiber-optic scintillator radiation detector 100 would also respond to gamma radiation. More specifically, as will be understood by one of ordinary skill in the art, incoming gamma rays generate energetic electrons, known as Compton electrons. These electrons also generate scintillation light in the optical cores 120. While the scintillation light generated from a Compton electron in a single optical core 120 is small, when the cores 120 are closely-packed the Compton electron crosses many neighboring cores 120 and the sum of the light collected in those cores 120 can be comparable to that from a single neutron event. In such a case, the incoming gamma ray will have mimicked a neutron event, which is not desirable as it acts as a source of background noise for neutron detection. Accordingly, with reference again to FIGS. 2 and 3, the interposer material 128 is employed to absorb the Compton electrons and to prevent their passage through multiple optical cores 120. In such a fashion, the gamma rejection ratio of the detector 100 is increased, thereby reducing its sensitivity to the incoming gamma rays.

The interposer material 128 may be any material that is effective at stopping the Compton electrons from travelling between the optical cores 120, but that does not also react strongly to neutrons. Specifically, the interposer material 128 may be any material having an average atomic number less than 13 (more preferably less than 11, even more preferably less than 9, and most preferably less than 7) and a density greater than 1.3 g/cm$^3$ (more preferably greater than 1.5 g/cm$^3$, even more preferably greater than 1.7 g/cm$^3$, and most preferably greater than 2.0 g/cm$^3$). For example, silicon dioxide may be employed as the interposer material 128 because it has an average atomic number of 10 (i.e., SiO$_2$ comprises a silicon atom having an atomic number of 14 and two oxygen atoms having atomic numbers of 8) and a density greater than 2.0 g/cm$^3$. Other exemplary materials that may be employed for the interposer material 128 include graphite, glass, and organic polymers, plastics, and epoxies having an average atomic number less than 13 and a density greater than 1.3 g/cm$^3$.

An interposer material 128 with a density lower than 1.3 g/cm$^3$ does not provide any appreciable increase in the gamma rejection ratio. In addition, an interposer material 128 with an average atomic number of 13 or greater tends to generate more Compton electron scintillation light due to larger photoelectron production. Accordingly, any such materials are not appropriate for use in the detector 100.

In addition to the interposer material 128 absorbing the Compton electrons, the mere fact that the optical cores 120 are spaced apart from one another also reduces the Compton electron cross-talk between the optical cores 120. In one embodiment, the optical cores 120 are regularly spaced from one another. Optimally, as illustrated in FIGS. 2 and 3, the optical cores 120 are spaced such that a center of each optical core 120 is at a distance of approximately twice the core 120 diameter d from a center of each of its neighboring optical cores 120. This is the optimal optical fiber layout geometry in the sense that smaller separations between the optical cores 120 results in a decrease in the gamma rejection ratio, but larger separations yield no further increase in the gamma rejection ratio and disadvantageously result in a larger detector. In certain embodiments, the spacing between the centers of the all optical cores 120 lies in a range between approximately 10 microns and approximately 600 microns (i.e., the diameter of each optical core 120 is between approximately 5 microns and approximately 300 microns).

The interposer material 128 may be applied in any of a variety of fashions. For example, with reference to FIG. 2, an interposer material 128 of appropriate thickness may be coated on the exterior of the cladding 124 of each fiber prior to the fibers being bundled together in the fiber layer 104. Alternatively, as previously discussed with reference to FIG. 2, the interposer material 128 may be a solid block with tubular passages formed (e.g., drilled) therethrough at an appropriate pitch ratio and the fibers may be secured therein. As another example, with reference to FIG. 3, prior to applying a cladding 124 to each optical core 120, the optical core 120 may first be coated with an interposer material 128. Once dry, the cladding 124 may be applied and the fibers then bundled together to form the fiber layer 104. As will be understood by those of ordinary skill in the art, such methods of manufacturing the fiber layers 104 are exemplary and non-limiting. Other approaches may also be employed.

Advantageously, in various embodiments, use of the interposer material 128 and appropriate spacing between the optical cores 120 yields a gamma rejection ratio of approximately $10^5:1$. A gamma rejection ratio of that level is approximately 10 times greater than that typically achieved in the current state of the art, and, as described herein, may be achieved with little to no added system complexity.

Commercially, various embodiments of the fiber-optic scintillator radiation detector 100 described herein may be used, for example, in homeland security operations at borders and at various other ports of entry (e.g., in weapons smuggling detection), in detecting and locating weapons of mass destruction abroad, in cargo radionuclide monitoring applications, in ensuring that nuclear material (e.g., plutonium) is not accidentally or intentionally diverted from controlled facilities, in monitoring long-term storage of nuclear materials, in fuel rod scanning in nuclear power reactors, and in numerous other applications.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A fiber-optic scintillator radiation detector, comprising: a plurality of optical fibers each comprising an optical core, the optical cores spaced apart from one another by an interposer material having an average atomic number less than 13 and a density greater than 1.3 g/cm$^3$.

2. The detector of claim 1, wherein the interposer material comprises at least one of silicon dioxide, graphite, glass, an organic polymer, a plastic, or an epoxy.

3. The detector of claim 1, wherein each optical fiber further comprises a cladding surrounding its optical core.

4. The detector of claim 3, wherein the interposer material is encapsulated between the cladding and the optical core of each optical fiber.

5. The detector of claim 3, wherein a matrix of the interposer material surrounds the cladding of each optical fiber.

6. The detector of claim 1, wherein the detector has a gamma rejection ratio of approximately $10^5:1$.

7. The detector of claim 1, wherein the optical cores are regularly spaced.

8. The detector of claim 7, wherein a center of each optical core is at a distance of approximately twice the core diameter from a center of each of its neighboring optical cores.

9. The detector of claim 1, wherein the spacing between the center of each optical core lies in a range between approximately 10 microns and approximately 600 microns.

10. A fiber-optic scintillator radiation detector, comprising: a plurality of optical fibers each comprising an optical core, the optical cores regularly spaced apart from one another by an interposer material such that a center of each optical core is at a distance of approximately twice the core diameter from a center of each of its neighboring optical cores.

11. A method for detecting radiation, comprising: detecting a neutron with a plurality of optical fibers sensitive thereto, each fiber comprising an optical core and the optical cores being spaced apart from one another by an interposer material having an average atomic number less than 13 and a density greater than 1.3 g/cm$^3$.

12. The method of claim 11, wherein the detected neutron has an energy level on the order of or less than $2.5 \times 10^{-8}$ MeV.

13. The method of claim 12, wherein the detected neutron is a thermal neutron.

14. The method of claim 11 further comprising absorbing Compton electrons in the interposer material.

15. The method of claim 11, wherein the interposer material and the spacing of the optical cores provide a gamma rejection ratio of approximately $10^5:1$.

16. The method of claim 11, wherein the interposer material comprises at least one of silicon dioxide, graphite, glass, an organic polymer, a plastic, or an epoxy.

17. The method of claim 11, wherein each optical fiber further comprises a cladding surrounding its optical core.

18. The method of claim 17, wherein the interposer material is encapsulated between the cladding and the optical core of each optical fiber.

19. The method of claim 17, wherein a matrix of the interposer material surrounds the cladding of each optical fiber.

20. The method of claim 11, wherein the optical cores are regularly spaced.

21. The method of claim 20, wherein a center of each optical core is at a distance of approximately twice the core diameter from a center of each of its neighboring optical cores.

22. The method of claim 11, wherein the spacing between the center of each optical core lies in a range between approximately 10 microns and approximately 600 microns.

23. A method for detecting radiation, comprising: detecting a neutron with a plurality of optical fibers sensitive thereto, each fiber comprising an optical core and the optical cores being regularly spaced apart from one another by an interposer material such that a center of each optical core is at a distance of approximately twice the core diameter from a center of each of its neighboring optical cores.

* * * * *